United States Patent [19]
Thorson

[11] Patent Number: 5,003,159
[45] Date of Patent: Mar. 26, 1991

[54] FOOD SERVICE SYSTEM
[75] Inventor: Robert D. Thorson, St. Paul, Minn.
[73] Assignee: Minnesota Mining and Manufacturing Company, St. Paul, Minn.
[21] Appl. No.: 496,451
[22] Filed: Mar. 20, 1990
[51] Int. Cl.[5] ............................................. F27D 11/02
[52] U.S. Cl. .................................... 219/386; 219/432; 219/521
[58] Field of Search ............... 219/385, 386, 387, 521, 219/432; 165/918, 919

[56] References Cited
U.S. PATENT DOCUMENTS

| | | | |
|---|---|---|---|
| D. 238,542 | 1/1976 | Shevlin | D7/18 |
| 2,680,190 | 6/1954 | Schmidt | 219/432 |
| 2,863,037 | 12/1958 | Johnstone | |
| 3,505,498 | 4/1970 | Shevlin | 219/385 |
| 3,590,727 | 7/1971 | Shevlin | 99/359 |
| 3,596,059 | 7/1971 | Hager | 219/432 |
| 3,608,627 | 9/1971 | Shevlin | 165/2 |
| 3,725,645 | 4/1973 | Shevlin | 219/521 |
| 3,736,981 | 6/1973 | Shevlin | 165/2 |
| 3,784,787 | 1/1974 | Shevlin | 219/386 |
| 3,830,148 | 8/1974 | Shevlin | 99/359 |
| 3,904,778 | 9/1975 | Shevlin | 426/418 |
| 4,285,391 | 8/1981 | Bourner | 165/30 |
| 4,560,859 | 12/1985 | Brennan | 219/386 |
| 4,584,466 | 4/1986 | de Mola | 219/386 |
| 4,751,368 | 6/1988 | Daifotes | 219/432 |

OTHER PUBLICATIONS

"3M Technology Connects You to the Advanced Food Preparation Method Cart", Aug. 1989.
The 3M Food Service System, "Attractively Designed Tray Setups Enhance the Appearance of your Meals", Sep. 1987.
The 3M Food Service System, "High Quality Equipment for Advanced Food Preparation", Jun. 1988.
Aladdin Advanced Meal System, "Temp-Rite II Excel Rethermalization Cart", Aug. 1989.

Primary Examiner—Teresa J. Walberg
Attorney, Agent, or Firm—Armstrong, Teasdale, Schlafly, Davis & Dicus

[57] ABSTRACT

A food service system for serving meals that include hot foods. The system comprises at least one generally circular dish having a top surface for holding the foods that are to be served warm, and a bottom surface, an electrical heating element in the dish for heating the foods on the top surface of the dish, and first and second electrical contacts on the bottom surface of the dish for supplying electrical energy to the heating element. The system further comprises at least one tray, having at least one generally circular well therein for receiving one of the generally circular dishes, and at least one aperture in the well for exposing the first and second electrical contacts on the bottom surface of the dish when the dish is seated in the well. The dish includes at least one foot and the well in the tray includes at least one stop for orienting the dish in the tray to orient the first and second contacts with respect to the aperture. The system further comprises a support for each tray, each support including first and second electrical power supply contacts for each dish, configured to make electrical contact with exposed first and second electrical contacts on the dish received in the well in a tray supported on the support.

20 Claims, 4 Drawing Sheets

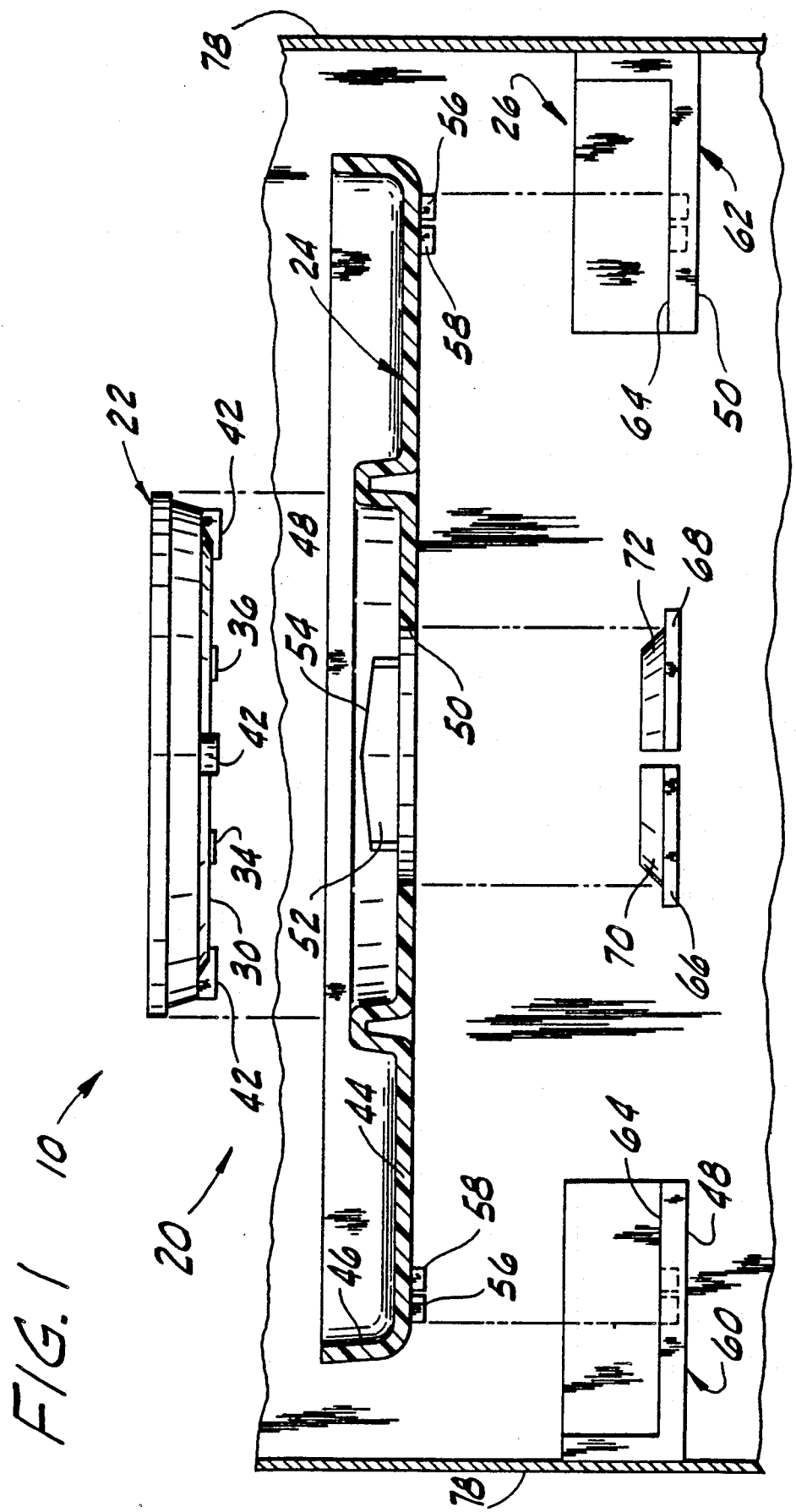

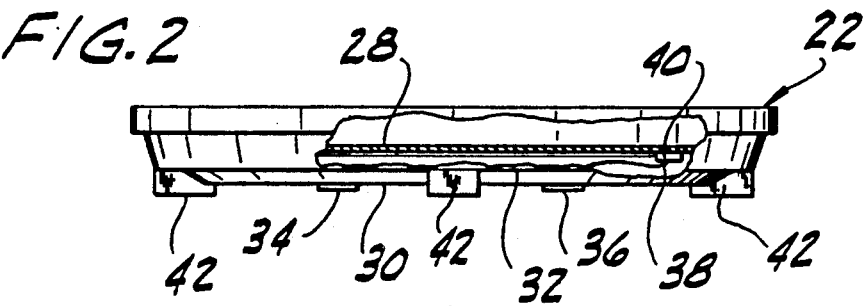
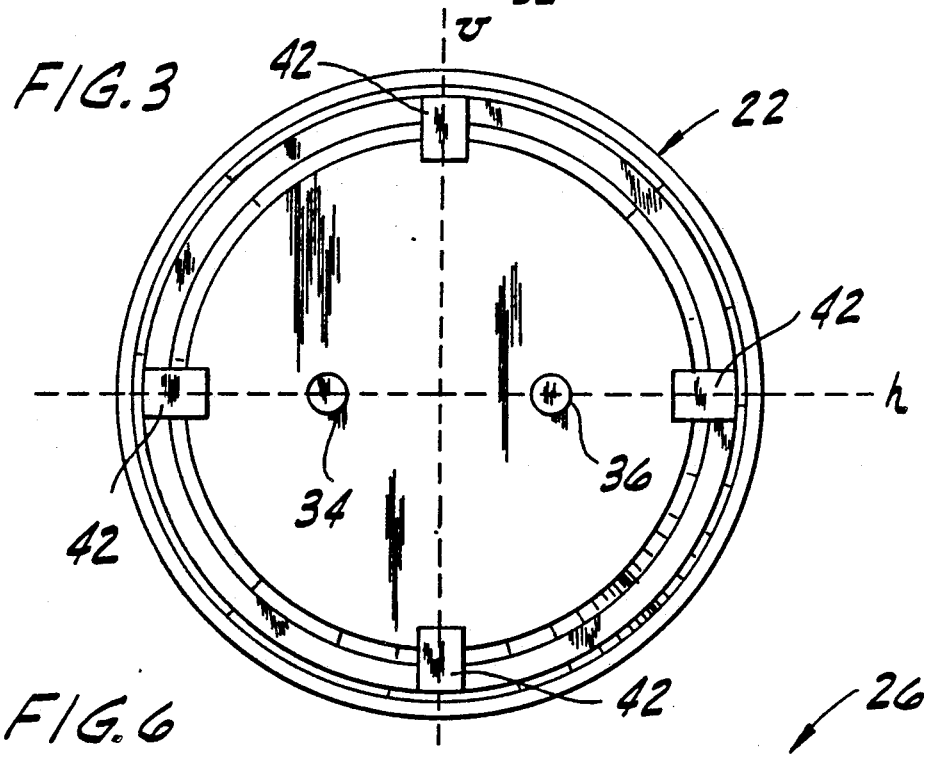
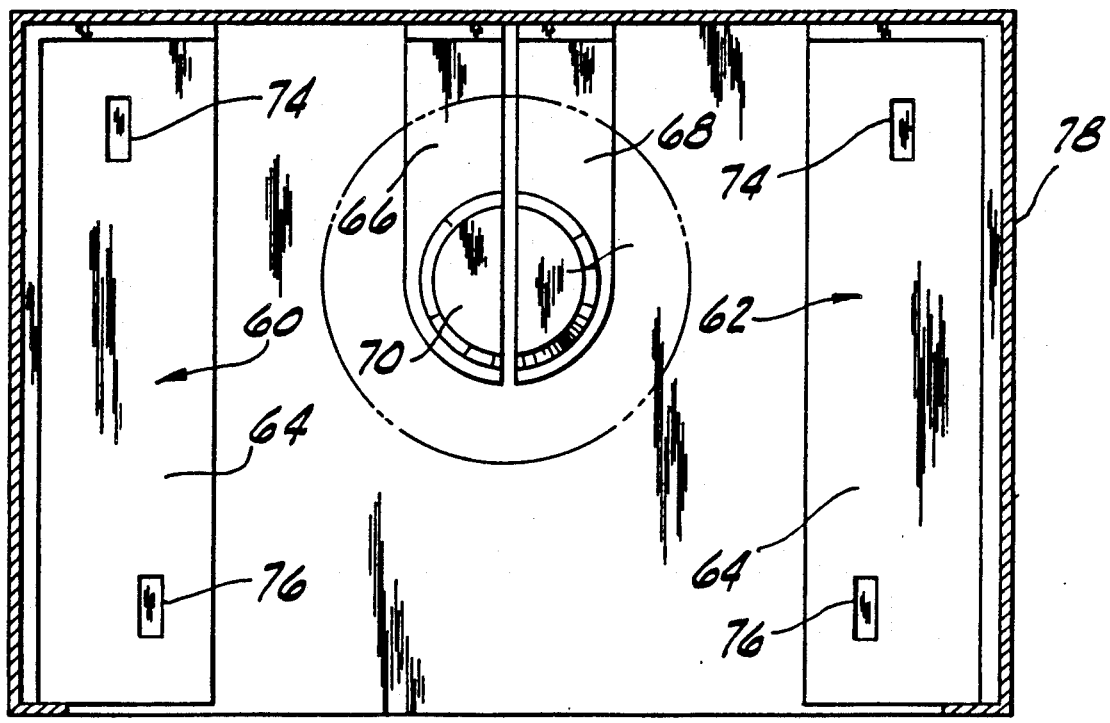

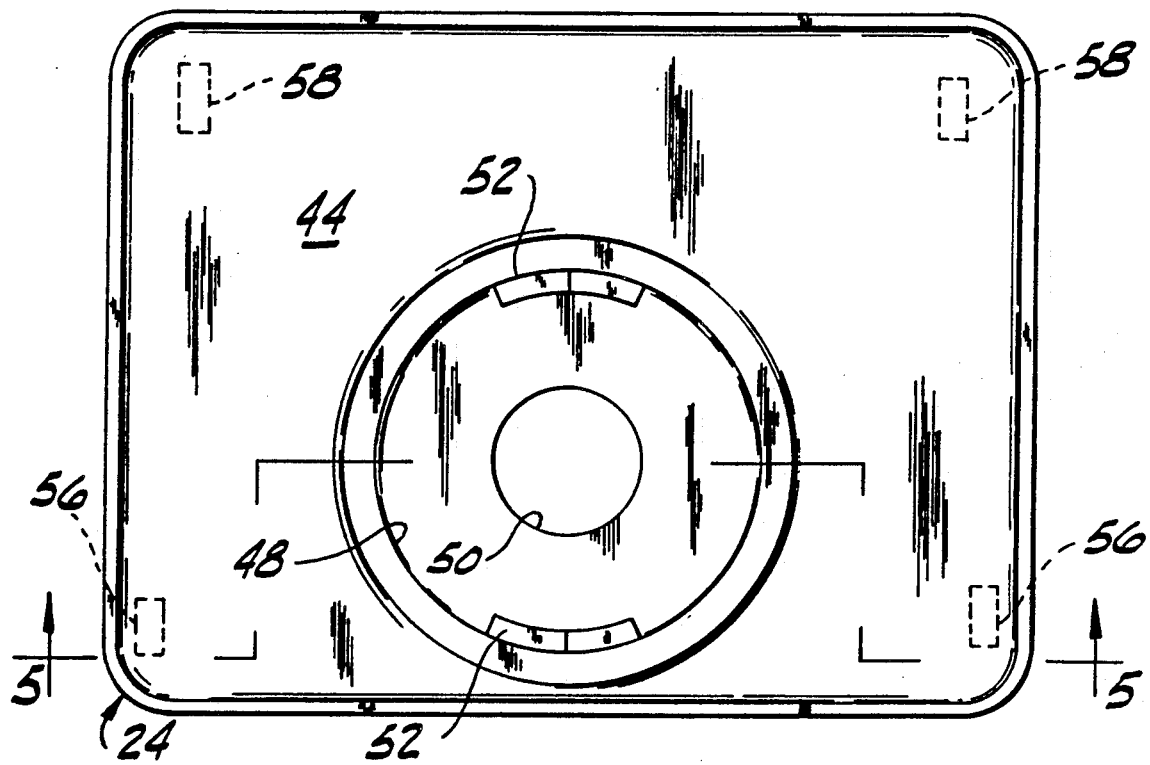
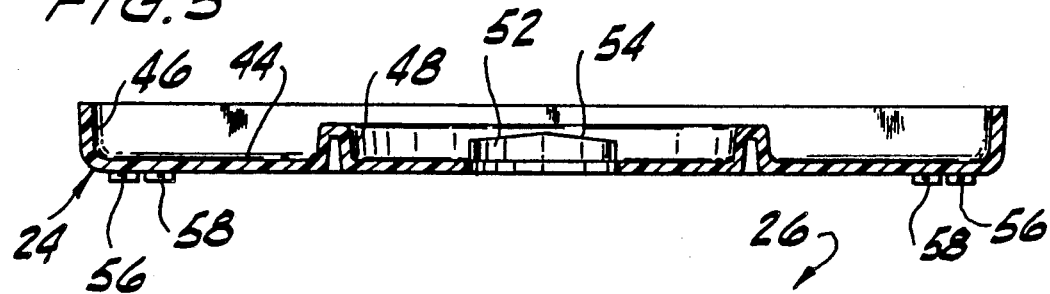
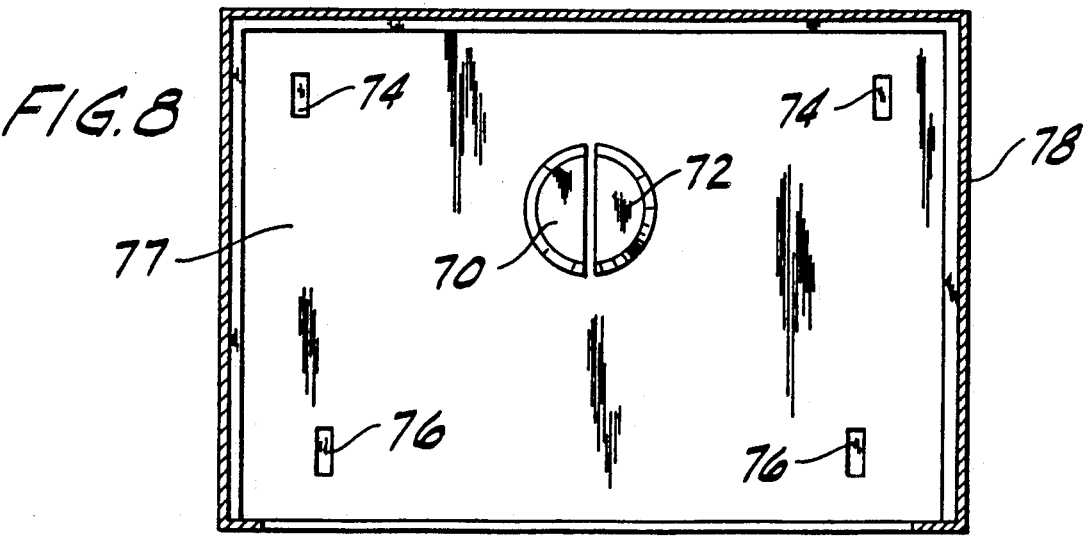

FOOD SERVICE SYSTEM

BACKGROUND OF THE INVENTION

This invention relates to a food service system for serving meals that include hot or warm foods, and in particular to a dish and tray combination for use in such a system.

Institutional meals, such as those served in hospitals, are often prepared in advance, quick-chilled or frozen, and held in storage for rethermalization or reheating when needed. This method offers several advantages. Advanced food preparation smooths out the work load for the food preparers. Furthermore, since meal production can be independent of when the meals are served, several meals can be prepared at once, streamlining the process and condensing production time so that labor costs are lower and productivity is higher. Advanced preparation also eliminates "left over" meals, thereby reducing waste. Lastly, and perhaps most importantly, studies have shown that advanced preparation produces meals that are better tasting, more appealing, and more nutritious than meals that are cooked and held at serving temperature for extended periods. With advanced preparation, food is heated just before serving to assure hot, fresh, attractive meals. Advanced preparation also ensures uniform meal quality.

In an advance preparation system the entire meal, including foods that are served warm and cold, is assembled on a tray. The foods that are to be served warm are put on special dishes having heating elements and electrical contacts. These special dishes are registered in special locations on the tray. The trays are then loaded into a specially constructed cart, and the cart is stored in a refrigeration unit until mealtime. At mealtime, the food on the special dishes can be thermalized or heated by connecting the electrical contacts to an electric power supply. The carts are specially constructed to conduct electrical energy to the special dishes to heat the food. Little heat is lost from the special dishes to the surrounding food on the trays, so the cold food remains cold. When the proper serving temperature is reached, the meal is ready to be served. An example of an excellent advance preparation meal service system is shown in co-assigned Shevlin, U.S. Pat. No. 3,736,981, incorporated herein by reference.

A draw-back of the advance preparation food systems heretofore used is that they employ rectangular or other unusually shaped dishes, that fit into corresponding wells in the tray. The rectangular shape of the dishes and the wells was necessary to properly register the dish in the well so that the electrical contacts on the dish would be properly aligned with the power supply contacts in the carts. However, the rectangular shapes are unaesthetic. Moreover, these unfamiliar shapes emphasize the institutional nature of the surroundings and may even diminish the perceived quality of the meal.

SUMMARY OF THE INVENTION

The food service system of the present invention allows for the advance preparation of meals including foods that are served warm and cold, the cold storage of these meals, and the rapid reheating of the warm foods, while using conventionally-shaped circular dishes that are familiar to the diners. Despite the use of circular dishes the system ensures proper registration of the dishes in the trays, and of the trays in the cart so that the foods are properly reheated. The system may even include thermostats to prevent over-heating of the foods.

The food service system of the present invention is adapted for serving meals that include warm foods. Generally the system comprises at least one generally circular dish having a top surface for holding the foods that are to be served warm, and a bottom surface, an electrical heating element in the dish for heating the foods on the top surface of the dish, and first and second electrical contacts on the bottom surface of the dish for supplying electrical energy to the heating element. The system further comprises at least one tray, having at least one recess or well therein for receiving at least one of the generally circular dishes, and at least one aperture in the well for exposing the first and second electrical contacts on the bottom surface of the dish when the dish is seated in the well. The dishes and the trays have cooperating orienting means for orienting the dish in the tray to orient the first and second contacts with respect to the aperture. The system further comprises supports for one or more trays, each support including first and second electrical power supply contacts. The power supply contacts are configured to make electrical contact with exposed first and second electrical contacts of the dish.

The cooperating orienting means causes the dish to be oriented with respect to the tray so that when the tray is supported by a support, each of the first and second contacts on the dish is in contact with one of the first and second electrical power supply contacts. The orienting means preferably comprises at least one foot on the dish and at least one stop in the well in the tray which can engage the foot to prevent the dish from seating in the well. There are preferably at least two of either the feet or the stops. The stop is positioned to prevent the dish from seating in the well in certain orientations. The top surface of the stop may be sloped so that when it is engaged by the foot it urges the dish out of certain orientations. There are preferably a plurality of feet on the dish, equally spaced about the circumference of the dish.

The support for the trays preferably also includes indexing means for properly aligning the trays with the power supply contacts. The indexing means may include means for preventing contact with the power supply contacts unless the tray is properly seated in the support means. The tray may have tabs thereon which drop into mating recesses in the support so that the tray drops into position relative to the power supply contacts, and the power supply contacts project upwardly into the aperture.

The aperture in the tray is preferably circular, and the first electrical power supply contact extends over substantially half of the area of the aperture and the second electrical power supply contact extends over substantially the other half of the area of the aperture.

Thus, the food service system of the present invention allows for the advance preparation of meals including foods that are served hot and cold, the cold storage of these meals, and the rapid reheating of the warm foods, while using conventionally-shaped circular dishes. The cooperating orienting means on the dishes and the trays ensures proper registration of the dishes in the trays. The indexing means on the trays and the supports ensures the proper alignment of the trays with respect to the power supply contacts so that the foods are properly reheated. The dishes may even include thermostats to prevent the foods from being overheated.

These and other features and advantages will be in part apparent and in part pointed out hereinafter.

BRIEF DESCRIPTION OF THE DRAWINGS

FIG. 1 is an exploded side elevation view of a plate, tray, and support adapted for use in the food service system of the present invention;

FIG. 2 is a side elevation view of the plate adapted for use in the food service system of the present invention, with portions broken away to reveal the details of construction;

FIG. 3 is a bottom plan view of the plate;

FIG. 4 is a top plan view of the tray adapted for use in the food service system of the present invention;

FIG. 5 is a cross-sectional view of the tray taken along the plane of line 5—5 in FIG. 4;

FIG. 6 is a top plan view of the tray support and power supply contacts adapted for use in the food service system of the present invention;

FIG. 8 is a top plan view of an alternate embodiment of the support, in the form of a shelf.

Corresponding reference numerals indicate corresponding parts throughout the several views of the drawings.

DETAILED DESCRIPTION OF THE PREFERRED EMBODIMENT

Figure 7:
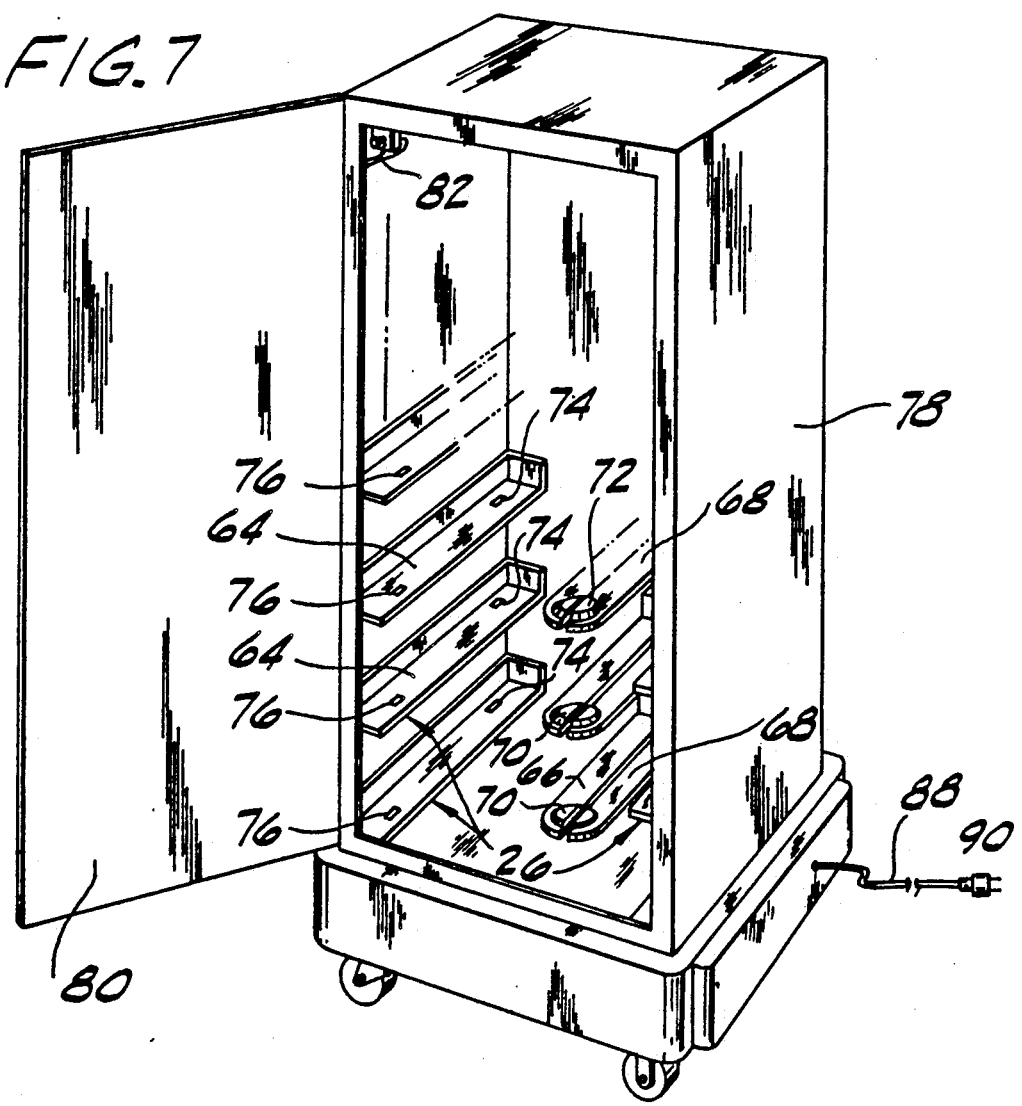
FIG. 7 is a perspective view of a cart adapted for use in the food service system of the present invention, showing the positioning of tray supports.

A food service system for serving meals that include hot foods is indicated generally as 20 in FIG. 1. The system 20 comprises a plate 22 or other dish, a tray 24, and a tray support 26. While the preferred embodiment is described in terms of plate 22, this invention is not so limited, and applies to any type of dish including plates, bowls, etc.

The plate 22 is generally circular, having a top surface 28 for holding the foods that are to be served warm, and a bottom surface 30. As shown in FIG. 2, the plate 22 is preferably hollow, and includes a heating element 32 on the underside of the top surface 28 for heating the foods on the top surface of the plate. The plate 22 also includes first and second electrical contacts 34 and 36 on the bottom surface 30 of the plate for supplying electrical energy to the heating element 32. The first and second contacts 34 and 36 are preferably raised circular buttons projecting slightly from the bottom surface 30 of the plate. The first and second contacts 34 and 36 are preferably located along one diameter of the generally circular plate (i.e., the generally horizontal line h in FIG. 3), but are on diametrically opposite halves of the plate (i.e.. they are separated by the generally vertical diameter v in FIG. 3). The heating element 32 is electrically connected with the contacts 34 and 36 with wires 38. A thermostat 40 may be interposed between the contacts and the heating element 32 to cut off the supply of electrical energy to the heating element when the plate reaches a certain preselected temperature.

There is at least one foot 42 on the bottom of the plate 22. In this preferred embodiment there are four feet 42, equally spaced about the plate so that the plate 22 can rest stably on a flat surface. At least one foot 42 is located on the diametrical line h on which the contacts 34 and 36 are positioned.

The tray 24 comprises a bottom 44, and side edges 46. There is a generally circular recess or well 48 formed in the top surface of the bottom 44. The well 48 is sized and shaped to receive the plate 22. The walls of the recess 48 closely conform to the edges of the plate to fixedly locate the plate on the tray. Of course, the tray could be constructed with more than one well 48, so that the tray can mount more than one plate 22 or bowl (not shown). There is a generally circular aperture 50 through the bottom 44 of the tray 24, generally at the center of the well 48. The aperture 50 is sized, and the first and second contacts 34 and 36 are positioned on the bottom 30 of the plate 22, so that when the plate 22 is seated in the well 48, both of the contacts 34 and 36 are exposed through the aperture 50.

The well 48 includes at least one, and preferably two, stops 52. The stops 52 in the well 48 cooperate with the feet 42 on the plate 22 to orient the plate (and thus the contacts 34 and 36) with respect to the aperture 50. The stops 52 are adapted to engage the feet 42 on the plate and prevent the plate 22 from seating in the well 48 in certain orientations. The top surface 54 of the stops 52 is preferably sloped, and more preferably peaked, to facilitate rotation of the plate 22 to a correct orientation, should the plate be deposited in the well 48 in an incorrect orientation (i.e.. with one of the feet 42 on one of the stops 52). Depending upon the size of the feet and the stops, there may be just one of each, however this severely limits the number of permissible orientations of the plate 22 in the well 48. Preferably the feet and stops are relatively small to maximize the number of permissible orientations of the plate 22 in the well; however, then there must be at least two of either the feet or the stops to ensure that the plate 22 is properly oriented in the well.

The underside surface of the tray 24 has two pairs of tabs, a first pair of tabs 56 at the front edge of the tray, and a second pair of tabs 58 at the rear edge of the tray. The tabs 56 and 58 preferably have the same vertical height, so that the tray 24 can rest stably on a flat surface. However, the tabs 56 of the first pair preferably have some different configuration or positioning relative to the tabs 58 of the second pair. For example, as shown in FIG. 4, the tabs 56 of the first pair at the front edge of the tray are located closer to the side edges of the tray than are the tabs 58 of the second pair at the rear edge of the tray.

The tray support 26 preferably comprises left and right side rails 60 and 62. Each of the side rails includes a generally horizontal lip 64 for supporting the edges of the tray 24. The tray support 26 further comprises cantilever arms 66 and 68, which support first and second electrical power supply contacts 70 and 72 respectively. Of course if the trays have more than one well 48 for mounting more than one plate 22, then additional cantilever arms and power supply contact may be provided for the additional plates 22. Each of the electrical power supply contacts 70 and 72 has a generally semi-circular shape, and chamfered edges. Together the contacts 70 and 72 form a circle, smaller than the aperture 50 in the tray 24, so that the contacts 70 and 72 can project into the aperture 50 to make electrical contact with the first and second contacts 34 and 36 on a plate 22 seated the well 48 of a tray 24.

The rails 60 and 62 have first and second recesses 74 and 76 each adapted to receive the tabs 56 and 58, respectively, on the tray. When the tabs 56 and 58 on the tray are aligned with their respective recesses 74 and 76 in the rails, the tabs drop down into the recesses. The tabs 56 and 58 on the tray, and the recesses 74 and 76, together form indexing means for aligning the trays on the supports. They give a positive indication that the tray 24 is properly registered in the rails. They also prevent the tray 24 from being inadvertently dislodged from its proper position. Finally, they cause the tray 24 to drop vertically so that the electrical supply contacts 70 and 72 project up into the aperture 50, to engage contacts 34 and 36 on a plate 22 seated in the well 48. The contacts 70 and 72 preferably project sufficiently into the aperture to lift the plate 22 slightly off the tray so that the weight of the plate and its contents hold the contacts on the plate against the contacts 70 and 72. The plate 22 is not lifted so much that the feet 42 clear the stops 52. The different configuration or positioning between the tabs 56 and 58 and the recesses 74 and 76 prevents the tray from being seated on the rails 60 and 62 improperly.

Of course, as shown in FIG. 8, the tray support 26 could alternatively be constructed in the form of a shelf 77 for receiving an supporting the tray 24. The shelf would have contacts 70 and 72 mounted thereon, and recesses 74 and 76 provided therein.

Figure 9:
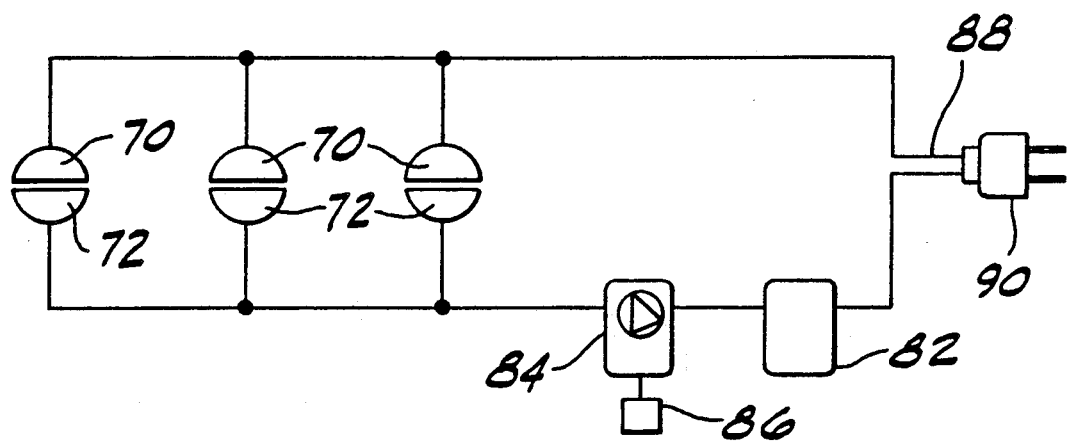
FIG. 9 is a schematic diagram of the power supply system in the cart.

As shown in FIG. 7, there are preferably a plurality of supports 26 mounted in a wheeled cart 78. The cart 78 includes a hingedly mounted door 80. An electrical power system, shown schematically in FIG. 9, provides electrical power to the contacts 70 and 72 of each of the plurality of supports 26 in the cart. The power system may include a safety interlock, such as a plunger-type switch 82 that interrupts the supply of power to the contacts 70 and 72 if the door 80 is not closed. The power system further includes a setable timer 84, and an activation switch 86. An external power supply cord 88 and a connector 90 are provided for making connection to a power supply to power the system.

OPERATION

In operation, meals are prepared including foods that are to be served hot and cold. The foods that are to be served warm are placed on plates 22, the other foods can be placed directly on the tray 24 or on other plates on the tray 24. The tray 24 may even include recesses for receiving these other plates. The plate 22 is then seated in the well 48. The feet 42 and the stops 52 cooperate to orient the generally circular plate 22 in the generally circular well 48, so that the contacts 34 and 36 are properly oriented with respect to the aperture 50.

The trays 24 are then placed on the supports 26 in the cart 78. The trays are slid rearwardly on the rails 60 and 62, until the tabs 56 and 58 on the trays 24 drop into the appropriate recesses 74 and 76. This provides a positive indication to the food preparation staff that the tray 24 is properly seated, and retains the tray 24 in its proper position during storage, reheating, and delivery. The tray 24 drops down over the contacts 70 and 72, which project upwardly into the aperture 50, lifting the plate 22. Because of the orientation function of the feet 42 and the stops 52, the plates 22 are oriented with respect to the tray 24 so that each of the contacts 70 and 72 only contacts one of the first and second electrical contacts 34 and 36 on the plate. Of course the feet 42 and stops 52 could be constructed so that each of the contacts 70 and 72 only contacts a particular one of the first and second contacts 34 and 36.

The door 80 is closed and the entire cart can be placed in refrigerated storage, until shortly before it is time to serve the meal. Shortly before the meal is to be served, the connector 90 is connected to a power supply and the timer 84 is set, and the power switch 86 is activated. This can be done while the cart is still in refrigerated storage. The electric current passes from the power supply contacts 70 and 72 to the contacts 34 and 36 on the individual plates, to heat the heating elements 32 in the individual plates 22. The timer 84 and the thermostats 40 in the plates 22 prevent the food from being overheated. Only the food on the plates 22 is heated.

The cart 78 is then disconnected from the power supply and used to deliver the meals. The meals are served on the trays 24, and the food is on conventionally shaped circular plates 22, making the meal more attractive and reducing the "institutional" character of the meal, while retaining all of the advantages of the advance preparation system.

As various changes could be made in the above constructions without departing from the scope of the invention, it is intended that all matter contained in the above description or shown in the accompanying drawings shall be interpreted as illustrative and not in a limiting sense.

What is claimed is:

1. A food service system for serving meals that include hot foods, the system comprising:
   at least one generally circular dish having a top surface for holding the foods that are to be served warm, and a bottom surface; an electrical heating element in the dish for heating the foods on the top surface of the dish; first and second electrical contacts on the bottom surface of the dish for supplying electrical energy to the heating element;
   at least one tray, having at least one generally circular well therein for receiving one of the generally circular dishes, and at least one aperture in the well for exposing the first and second electrical contacts on the bottom surface of the dish when the dish is seated in the well;
   cooperating orienting means on the dish and on the tray for orienting the dish in the tray to orient the first and second contacts with respect to the aperture;
   a support for each tray, each support including first and second electrical power supply contacts for each dish, configured to make electrical contact with exposed first and second electrical contacts of the dish received in a well in the tray supported on the support.

2. The system according to claim 1 further comprising a cart, and wherein there are a plurality of supports mounted in the cart.

3. The system according to claim 1 wherein the first and second power supply contacts are sized and shaped to project into the aperture.

4. The system according to claim 3 wherein the first electrical power supply contact extends over substantially half of the area of the aperture and wherein the second electrical power supply contact extends over substantially the other half of the area of the aperture.

5. The system according to claim 3 wherein the first electrical power supply contact extends circumferential around substantially half of the circumference of the aperture and the second electrical power supply contact extends around substantially the other half of the circumference of the aperture.

6. The system according to claim 4 wherein the aperture is generally circular, and wherein the first and second power supply contacts are generally semi-circular.

7. The system according to claim 1 wherein the cooperating orienting means causes the dish to be oriented in the well so that when the tray is supported in a support, the first and second contacts on each dish each contact a particular one of the first and second power supply contacts.

8. The system according to claim 1 wherein the cooperating orienting means comprises at least one foot on the dish and at least one stop in the well which can engage the foot to prevent the dish from seating in the well with the first and second contacts in certain orientations.

9. The system according to claim 8 wherein the top surface of the stop is sloped so that when a foot on the dish engages the stop, the dish is urged toward an orientation in which the foot does not engage the stop.

10. The system according to claim 8 wherein there are a plurality of feet on the dish.

11. The system according to claim 10 wherein the feet are equally spaced about the circumference of the dish.

12. The system according to claim 1 further comprising indexing means on the tray and the support for aligning the tray with respect to the support so that the power supply contacts engage the contacts on the dish in the well of a tray with respect to the support.

13. The system according to claim 12 wherein the indexing means comprises tabs on the tray, and means on the support for engaging the tabs for aligning the tray with respect to the support.

14. The system according to claim 13 wherein the means for engaging the tabs on the tray comprises recesses into which the feet fit to lower the tray relative to the power supply contacts so that the power supply contacts project into the aperture to contact the first and second contacts on the dish in the well on the tray.

15. The system according to claim 14 wherein the aperture is generally circular and wherein the first and second power supply contacts are each generally semi-circular.

16. A dish and tray combination for use in a food service system of the type including supports for supporting a plurality of trays and having electrical contact means for providing electrical energy to heat food on at least one dish on each tray supported on the supports, the dish and tray combination comprising:
   a generally circular dish having a top surface for holding the foods that are to be served warm, and a bottom surface; an electrical heating element in the dish for heating the foods on the top surface of the dish; and first and second electrical contacts on the bottom surface of the dish for supplying electrical energy to the heating element;
   a tray, having at least one generally circular well therein for receiving the generally circular dish, and at least one aperture within the well for exposing the first and second contacts on the bottom surface of a dish received in the well; and
   cooperating orienting means on the dish and on the tray for orienting the dish in the tray t orient the first and second contacts with respect to the aperture.

17. The dish and tray combination according to claim 16 wherein the cooperating orienting means comprises at least one foot on the dish and at least one stop in the well which can engage the foot to prevent the dish from seating in the well with the first and second contacts in certain orientations, there being at least two of either the feet or the stops.

18. The dish and tray combination according to claim 17 wherein the top surface of the stop is sloped so that when a foot on the dish engages the stop, the dish is urged toward an orientation in which the foot does not engage the stop.

19. The dish and tray combination according to claim 17 wherein there are a plurality of feet on the dish.

20. The dish and tray combination according to claim 19 wherein the feet are equally spaced about the circumference of the dish.

* * * * *

UNITED STATES PATENT AND TRADEMARK OFFICE
CERTIFICATE OF CORRECTION

PATENT NO. : 5,003,159

DATED : March 26, 1991

INVENTOR(S) : Thorson

It is certified that error appears in the above-identified patent and that said Letters Patent is hereby corrected as shown below:

Col. 7, line 38, "feet" should read --tabs--.
Col. 8, line 23, "t" should read --to--.

Signed and Sealed this

Seventh Day of September, 1993

Attest:

BRUCE LEHMAN

Attesting Officer

Commissioner of Patents and Trademarks